US010965215B2

(12) United States Patent
Talari et al.

(10) Patent No.: US 10,965,215 B2
(45) Date of Patent: *Mar. 30, 2021

(54) CONSTANT ON-TIME BUCK CONVERTER WITH CALIBRATED RIPPLE INJECTION HAVING IMPROVED LIGHT LOAD TRANSIENT RESPONSE AND REDUCED OUTPUT CAPACITOR SIZE

(71) Applicant: Microchip Technology Incorporated, Chandler, AZ (US)

(72) Inventors: Surya Prakash Rao Talari, San Jose, CA (US); Venkata Murali Krushna Malla, Austin, TX (US); Ioan Stoichita, Campbell, CA (US); Matthew Weng, San Ramon, CA (US)

(73) Assignee: Microchip Technology Incorporated, Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/657,071

(22) Filed: Oct. 18, 2019

(65) Prior Publication Data

US 2021/0050790 A1 Feb. 18, 2021

Related U.S. Application Data

(60) Provisional application No. 62/887,288, filed on Aug. 15, 2019.

(51) Int. Cl.
*H02M 1/14* (2006.01)
*H02M 1/00* (2006.01)
*H02M 3/158* (2006.01)

(52) U.S. Cl.
CPC .............. *H02M 3/158* (2013.01); *H02M 1/14* (2013.01); *H02M 1/143* (2013.01);
(Continued)

(58) Field of Classification Search
CPC ................... H02M 1/14; H02M 1/143; H02M 2001/0025; H02M 3/158–1588; H02M 2001/0016; H02M 2001/0019
See application file for complete search history.

(56) References Cited

U.S. PATENT DOCUMENTS 6,801,080 B1 * 10/2004 Arcus .................. H03K 5/2481
327/379
8,541,993 B2 * 9/2013 Notman .............. H02M 3/1588
323/271

(Continued)

*Primary Examiner* — Thienvu V Tran
*Assistant Examiner* — Sisay G Tiku
(74) *Attorney, Agent, or Firm* — Burr & Forman LLP; Ryan M. Corbett

(57) ABSTRACT

According to an aspect of one or more exemplary embodiments, there is provided a constant on-time buck converter with calibrated ripple injection having improved light load transient response and reduced output capacitor size. The constant on-time buck converter may include a controller having a pulse width modulator (PWM) comparator that generates an on-time request, an error amplifier that regulates an average feedback voltage to an internal reference voltage, and passes a feedback node ripple signal to an input of the PWM comparator, an on-time generator that outputs an on-time signal that controls an on-time of the buck converter based on the on-time request, a MOSFET driver that drives the buck converter based on the output of the on-time generator, a zero crossing detection circuit configured to detect when a current through an inductor of the buck converter equals zero, and an injection signal generator coupled to the on-time generator, and that is configured to output an injection signal that limits a dip in an output voltage of the buck converter during a load transient based on an output of the zero crossing detection circuit indicating that the current through the inductor of the buck converter equals zero. The error amplifier may receive a feedback (Continued)

voltage based on the output of the injection signal generator and based on the output voltage of the buck converter.

18 Claims, 11 Drawing Sheets

(52) U.S. Cl.
CPC ............... *H02M 2001/0019* (2013.01); *H02M 2001/0025* (2013.01); *H02M 2001/0032* (2013.01)

(56) References Cited

U.S. PATENT DOCUMENTS

| | | | |
|---|---|---|---|
| 9,270,176 B1* | 2/2016 | Nguyen | H02M 3/156 |
| 9,306,454 B2 | 4/2016 | Jayaraj et al. | |
| 10,381,918 B1* | 8/2019 | Stoichita | H02M 1/15 |
| 2008/0088284 A1* | 4/2008 | Weng | H02M 3/1563 |
| | | | 323/271 |
| 2008/0088292 A1* | 4/2008 | Stoichita | H02M 3/156 |
| | | | 323/285 |
| 2009/0284235 A1* | 11/2009 | Weng | H02M 3/156 |
| | | | 323/222 |
| 2011/0285301 A1* | 11/2011 | Kuang | H05B 45/37 |
| | | | 315/200 R |
| 2013/0249508 A1* | 9/2013 | Rahimi | H02M 3/156 |
| | | | 323/271 |
| 2014/0375288 A1 | 12/2014 | Nora | |
| 2016/0336864 A1* | 11/2016 | Fang | H02M 3/33515 |
| 2017/0201175 A1* | 7/2017 | Chen | H02M 1/08 |
| 2018/0337599 A1* | 11/2018 | Chen | H02M 3/158 |

* cited by examiner

US 10,965,215 B2

CONSTANT ON-TIME BUCK CONVERTER WITH CALIBRATED RIPPLE INJECTION HAVING IMPROVED LIGHT LOAD TRANSIENT RESPONSE AND REDUCED OUTPUT CAPACITOR SIZE

CROSS REFERENCE TO RELATED APPLICATION

This application claims the benefit of U.S. Provisional Patent Application No. 62/887,288, filed on Aug. 15, 2019, which is incorporated by reference in its entirety.

FIELD

The present disclosure generally relates to load transient response improvement of a constant on time (COT) buck converter with calibrated ripple injection operating in discontinuous conduction mode (DCM) at light load.

BACKGROUND

Step down switching converters (Buck converters) are commonly used whenever DC voltage step down is required. A buck converter typically consists of a PWM (Pulse Width Modulation) controller, a Power Stage, and sensing circuits. The Power stage typically consists of two MOSFETs Q1 and Q2 (High side MOSFET Q1 and Low side MOSFET Q2), Inductor (L1) and output capacitor (COUT) as shown in FIG. 1. The PWM controller senses the output voltage (Q1, Q2 and Inductor current as well in some cases) and generates PWM control signals which drive Q1 and Q2 to regulate the output voltage, VOUT.

Buck converters can be divided into two categories: Synchronous and Asynchronous. A synchronous buck converter allows reverse current (current from drain terminal to source terminal of the low side MOSFET Q2), whereas an asynchronous buck converter does not allow reverse current through the low side MOSFET Q2. FIG. 1 shows a synchronous buck converter according to the prior art. If Q2 in FIG. 1 is replaced by a diode, it becomes an asynchronous buck converter as a diode does not allow reverse current through it. Synchronous buck converters give higher efficiency at higher load currents whereas asynchronous buck converters give higher efficiency at light loads.

A synchronous buck converter can be operated as an asynchronous buck converter by turning off the low side MOSFET (Q2 in FIG. 1) whenever reverse current (current from drain terminal to source terminal) is detected though it. This mode of operation is known as discontinuous conduction mode (DCM). Operating a synchronous converter in DCM mode at light loads improves light load efficiency. In a synchronous buck converter, the low side MOSFET (Q2) current is allowed to flow in both directions. This mode of operation is known as Continuous Conduction Mode (CCM).

When operating a converter in DCM mode at light loads, the output voltage dip may be higher when a sudden load is applied on the converter output. The voltage dip may be greatest when a load is suddenly applied to a converter that is initially operating at no load. In order to keep the output voltage deviation within the allowable range when a sudden load is applied, more output capacitors are generally added at the output of a converter. This leads to higher BOM (Bill Of Material) cost and increased solution size.

DETAILED DESCRIPTION OF EXEMPLARY EMBODIMENTS

The IC, architecture and method and timing described herein and illustrated in accompany drawings are general and are not limited to just COT converters, but can apply to any COT controller where the ripple injection circuit is external or internal or other equivalent alternatives or modified versions thereof.

Figure 1:
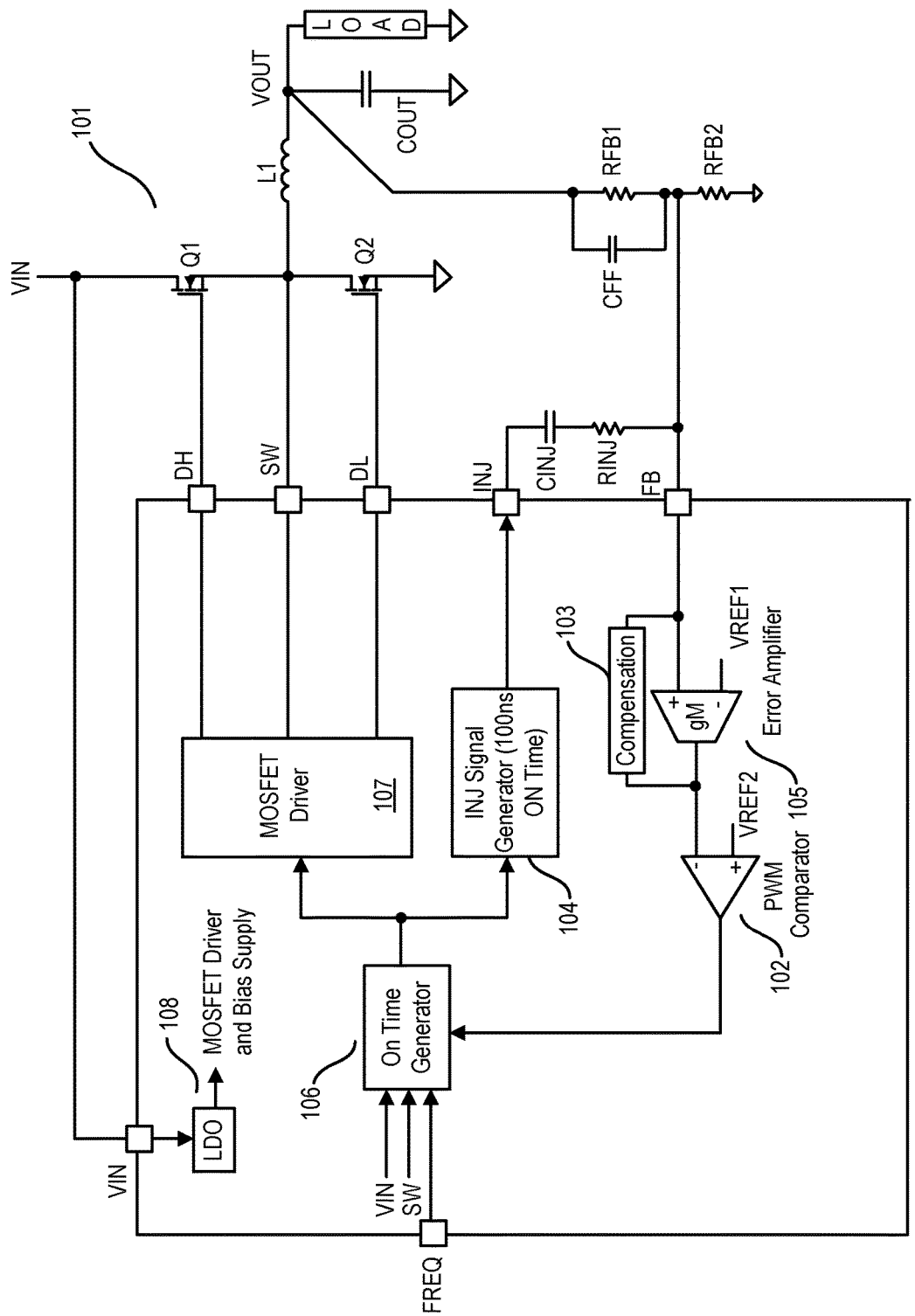
FIG. 1 is a functional block diagram and a typical application circuit of a constant on time (COT) buck converter with calibrated ripple injection according to the prior art.

FIG. 1 shows the block diagram and typical application circuit of a COT controller with external ripple injection circuit and with a typical calibrated ripple injection generator according to the prior art. The circuit of FIG. 1 contains an error amplifier 105 with a compensation circuit 103, a PWM comparator 102, an adaptive on-time generator 106, a MOSFET gate driver circuit 107, an INJ signal generator 104, and a low Dropout Regulator (LDO) 108.

The compensation circuit provides two functions. One is high DC gain, which causes the feedback voltage (voltage at FB pin) to track the reference voltage (VREF1). The other function is to pass the ripple voltage generated at feedback pin to the input of the PWM comparator 102.

The PWM comparator 102 compares the valley of the ripple voltage present at its inverting input with a reference voltage, VREF2. The PWM comparator 102 requests the on-time generator 106 to generate an ON time pulse when the valley of the ripple signal at its inverting input is below VREF2.

The on-time generator 106 generates a ON time pulse when the PWM comparator 102 requests it. The ON time generated by the on-time generator 106 adapts with input voltage and depends on output voltage and programmed switching frequency. Components connected at FREQ pin set the switching frequency.

The MOSFET driver 107 receives the output from the on-time generator 106 and provides high current drive signals which drive the external MOSFETs, Q1 and Q2 of the buck converter power stage 101.

The injection (INJ) signal generator 104 typically generates a fixed 100 ns signal. This signal along with the external components connected at the INJ pin are used for generating ripple voltage at the FB pin, which is required for COT control-based converters. In a typical COT converter, switch node (SW) is used instead of the INJ node to generate the ripple voltage at the FB pin. Using the INJ signal instead of the SW node to generate the ripple voltage at the FB pin provides the benefit of constant ripple voltage instead of a ripple voltage that is dependent upon the input voltage, which can be particularly important in applications where the input voltage varies over a wide range and the output voltage is close to the minimum input voltage.

Figure 2:
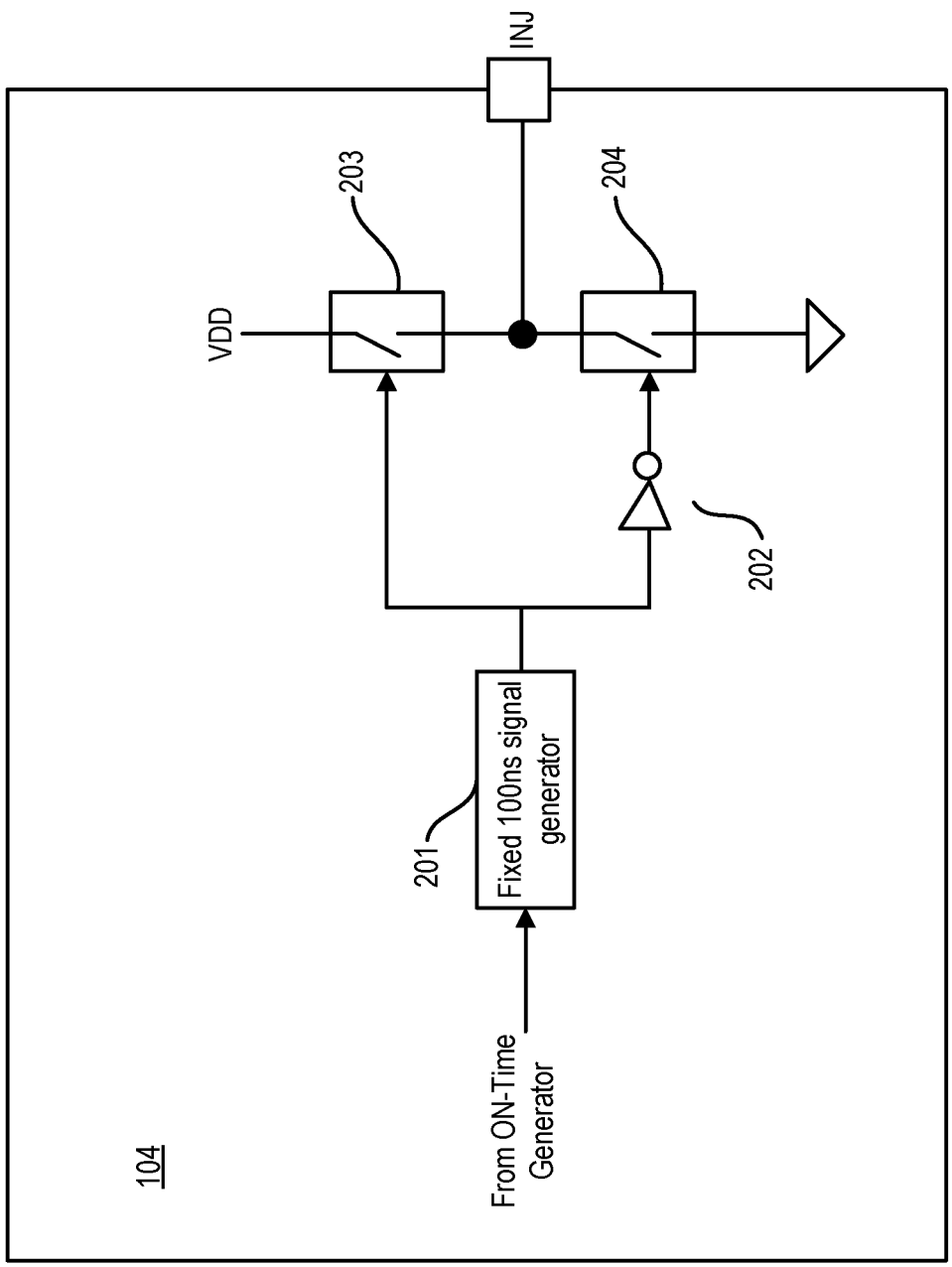
FIG. 2 shows a block diagram of a typical INJ signal generator used in a COT buck converter with calibrated ripple injection according to the prior art.

FIG. 2 illustrates the INJ signal generator 104 according to the prior art. The INJ signal generator 104 may include a fixed 100 ns signal generator that is coupled to the output of the on-time generator 106. The output of the fixed 100 ns signal generator is coupled to an inverter 202, the output of which is coupled to a switch 204. The switch 204 is coupled between the INJ node and ground. The output of the fixed 100 ns signal generator 201 is also coupled to a switch 203, which is coupled between VDD and the INJ node.

Figure 3:
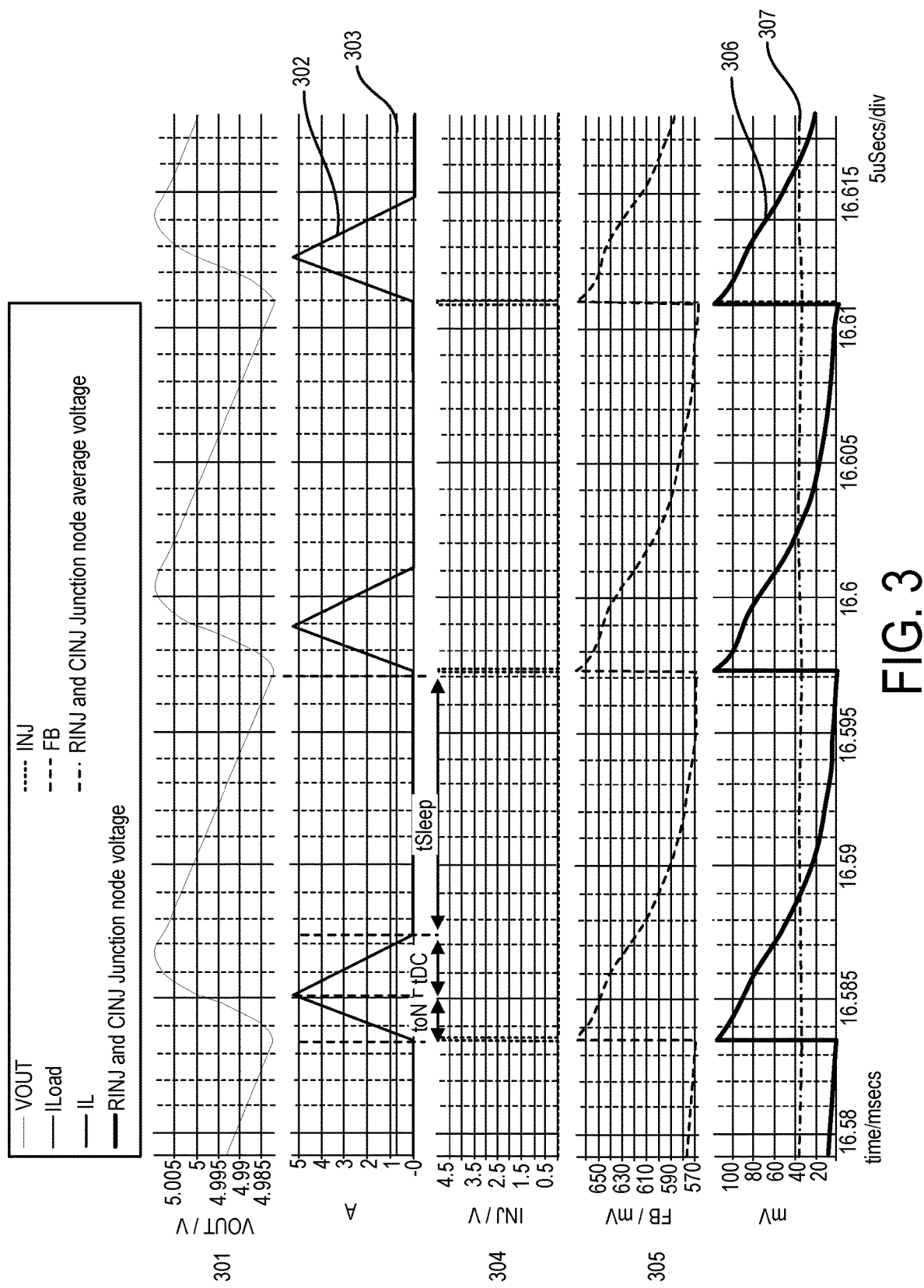
FIG. 3 shows steady state switching waveforms of the circuit of FIG. 1 operating at light load in DCM mode.

FIG. 3 shows steady state switching waveforms of the circuit of FIG. 1 operating at light load in DCM mode. Referring to FIG. 3, waveform 301 shows the output voltage VOUT, waveform 302 shows the current through inductor L1, waveform 303 shows the load current, waveform 304 shows the voltage at the INJ node, waveform 305 shows the voltage at the FB node, waveform 306 shows the voltage at the node between CINJ and RINJ, and waveform 307 shows the average voltage at the node between CINJ and RINJ.

Figure 4:
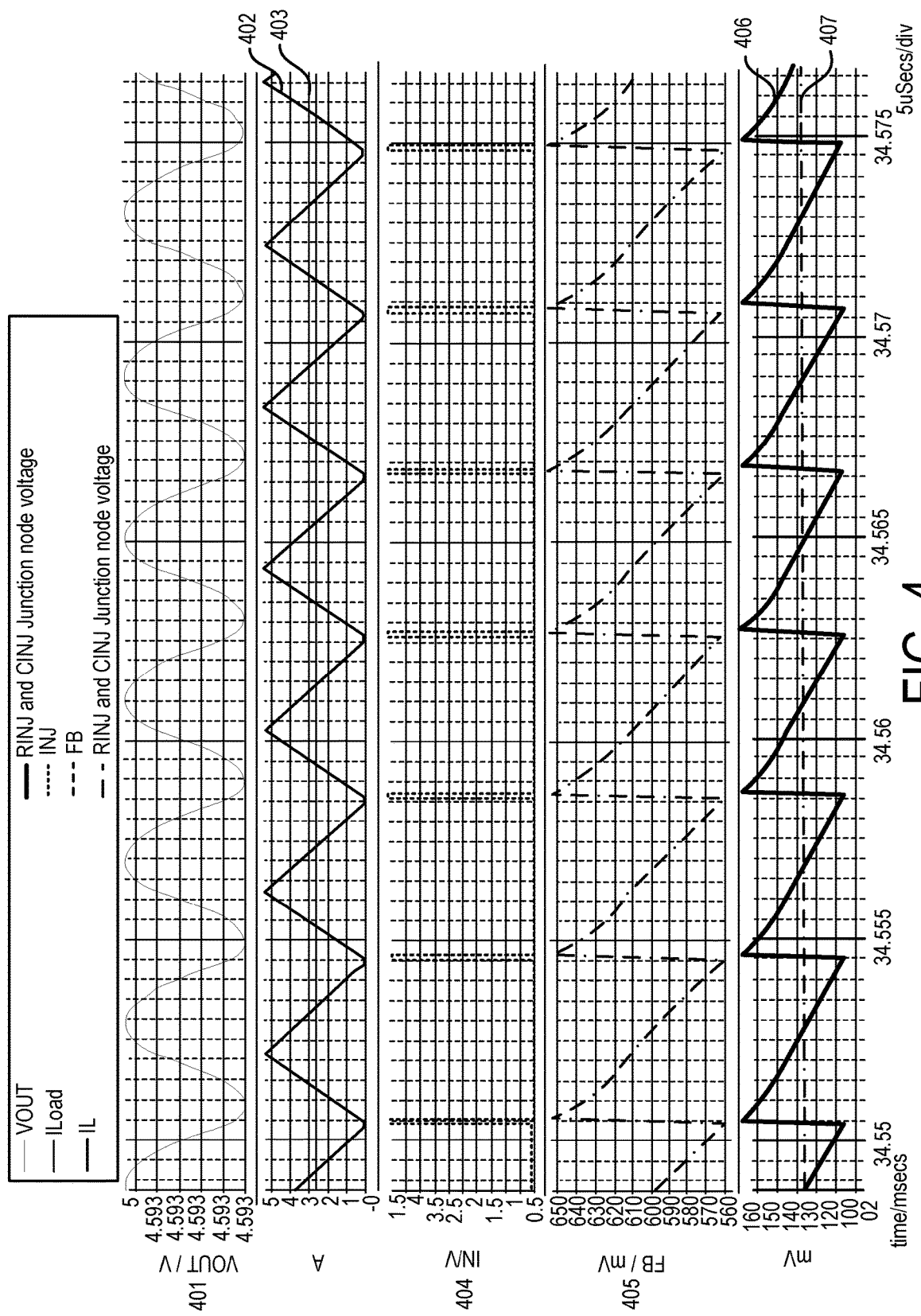
FIG. 4 shows steady state switching waveforms of the circuit of FIG. 1 operating in DCM mode at a load close to the DCM to CCM boundary.

FIG. 4 shows steady state switching waveforms of the circuit of FIG. 1 operating in DCM mode at a load close to the DCM to CCM boundary. Referring to FIG. 4, waveform 401 shows the output voltage VOUT, waveform 402 shows the current through inductor L1, waveform 403 shows the load current, waveform 404 shows the voltage at the INJ node, waveform 405 shows the voltage at the FB node, waveform 406 shows the voltage at the node between CINJ and RINJ, and waveform 407 shows the average voltage at the node between CINJ and RINJ.

Typically, the INJ signal generator 104 output is high for a fixed time (100 ns in this case) and is low for the remaining duration of the switching period (refer to FIG. 3) when the converter operates in continuous conduction mode (CCM). This creates an average voltage at the INJ pin which is given by (Equation 1 (below) when the converter is operating under steady state in CCM mode.

$$V_{INJ(Avg)} = V_{INJ} * \frac{t_{ON(INJ)}}{T_{sw}} \quad \text{(Equation 1)}$$

Where, VINJ is the magnitude of the INJ signal when it is high (typically 5V), $t_{ON(INJ)}$ is the duration of INJ signal when it is high, and $T_{sw}$ is the switching period of the converter.

The average INJ pin voltage when the converter is operating in DCM mode is given by (Equation 2 (below).

$$V_{INJ(Avg)} = V_{INJ} * \frac{t_{ON(INJ)}}{t_{ON(INJ)} + t_{OFF}} \quad \text{(Equation 2)}$$

Where $t_{OFF}$ is the OFF period of the converter.

The OFF period, $t_{OFF}$, consists of two durations when the converter is operating in DCM mode. One is the inductor current discharge time which is the duration the inductor current takes to fall from the value where it was at the end of ON time to 0A (tDC as shown in FIG. 3) at which the low side MOSFET (Q2) is turned OFF. The other duration is the sleep time (tSleep as shown in FIG. 3) during which both the MOSFETs, Q1 and Q2, are in high impedance mode. The load is supported by the output capacitors during the sleep time. For a given input voltage, output voltage, and programmed switching frequency, tDC is constant but tSleep depends on the load current. When the converter is operating in DCM mode, the average inductor current during tON+ tDC is higher than the load current. This causes the output voltage to increase. Increased output voltage causes the feedback (FB) voltage to increase and hence the converter does not turn on the high side switch (Q1) right after the inductor current drops to 0A, but waits until the output voltage, and hence the FB voltage, drops. The rate at which the output voltage drops is a function of load current, as a higher load current discharges the output capacitors quicker.

This makes the OFF time, and hence VINJ(Avg), a function of load current while the converter is operating in DCM mode (refer to (Equation 2). As the load current increases, the tSleep duration becomes shorter, which means that the OFF period becomes shorter, and VINJ(Avg) increases. The average INJ node voltage of the circuit shown in FIG. 1 is ≈40 mV when the load current is ≈750 mA, as shown in FIG. 3, whereas the average INJ node voltage is ≈120 mV when the load current is increased to ≈2.5 A, as shown in FIG. 4.

Figure 5:
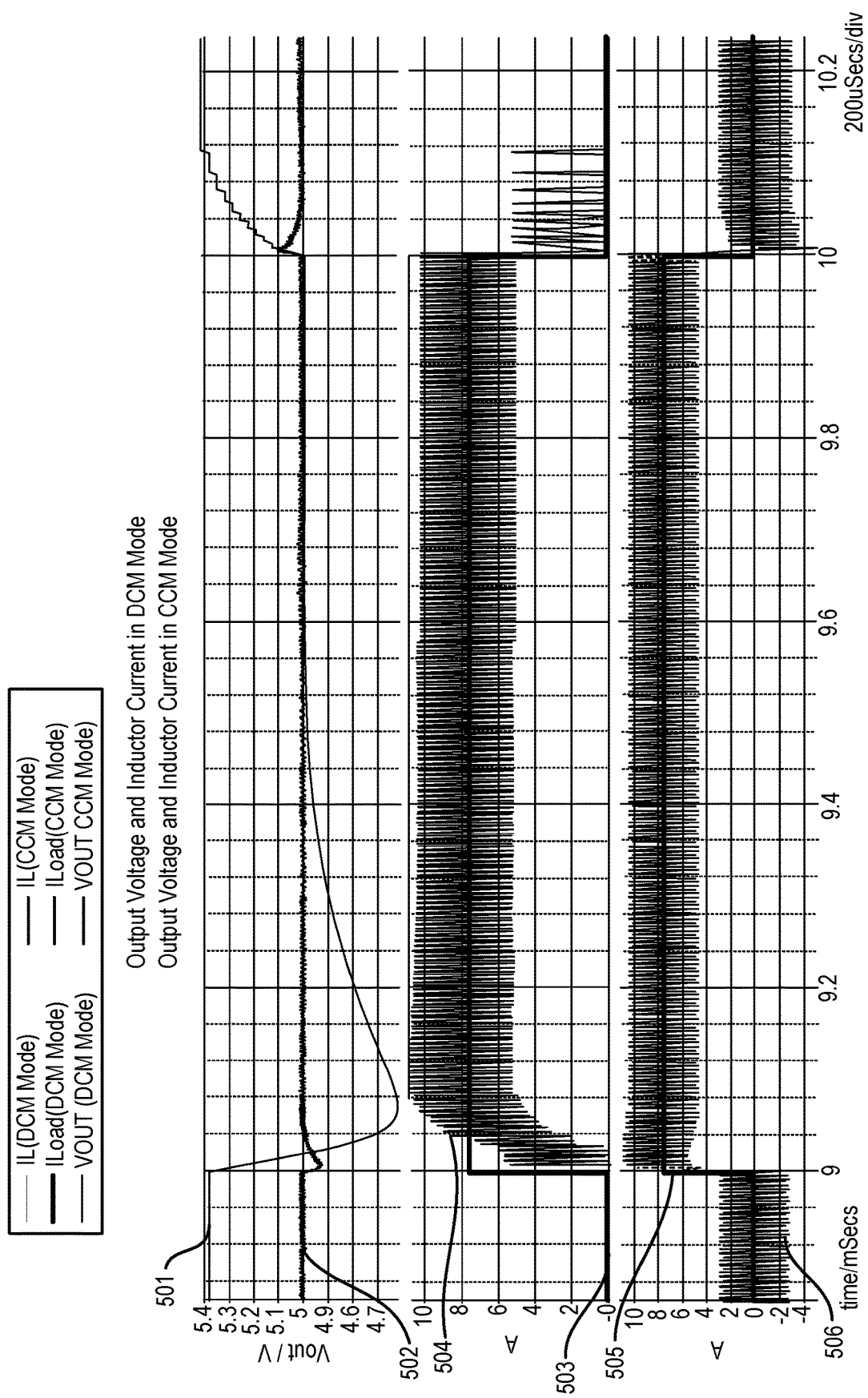
FIG. 5 shows the load transient response in DCM and CCM mode with a typical INJ signal generator shown in FIG. 2.

FIG. 5 shows the load transient response in CCM mode and in DCM mode when a 7.5 A load (which forces the converter into CCM mode) is suddenly applied (and subsequently removed) while the converter is operating at no load. Referring to FIG. 5, waveform 501 shows the output voltage VOUT in DCM mode, waveform 502 shows the output voltage VOUT in DCM mode, waveform 503 shows the load current in DCM mode, waveform 504 shows the current through inductor L1 in DCM mode, waveform 505 shows the load current in CCM mode, and waveform 506 shows the current through inductor L1 in CCM mode. As shown in FIG. 5, when the load is suddenly applied at the 9 mSec mark, the output voltage VOUT dips approximately 70 mV (1.4%) in CCM mode, whereas the output voltage VOUT dips approximately 384 mV (7.68%) in DCM mode, which is approximately 5.5 times the output voltage dip in CCM mode. In order to reduce the output voltage dip during load transient when the converter is operating in DCM mode, it is common to increase the output capacitance.

Figure 6:
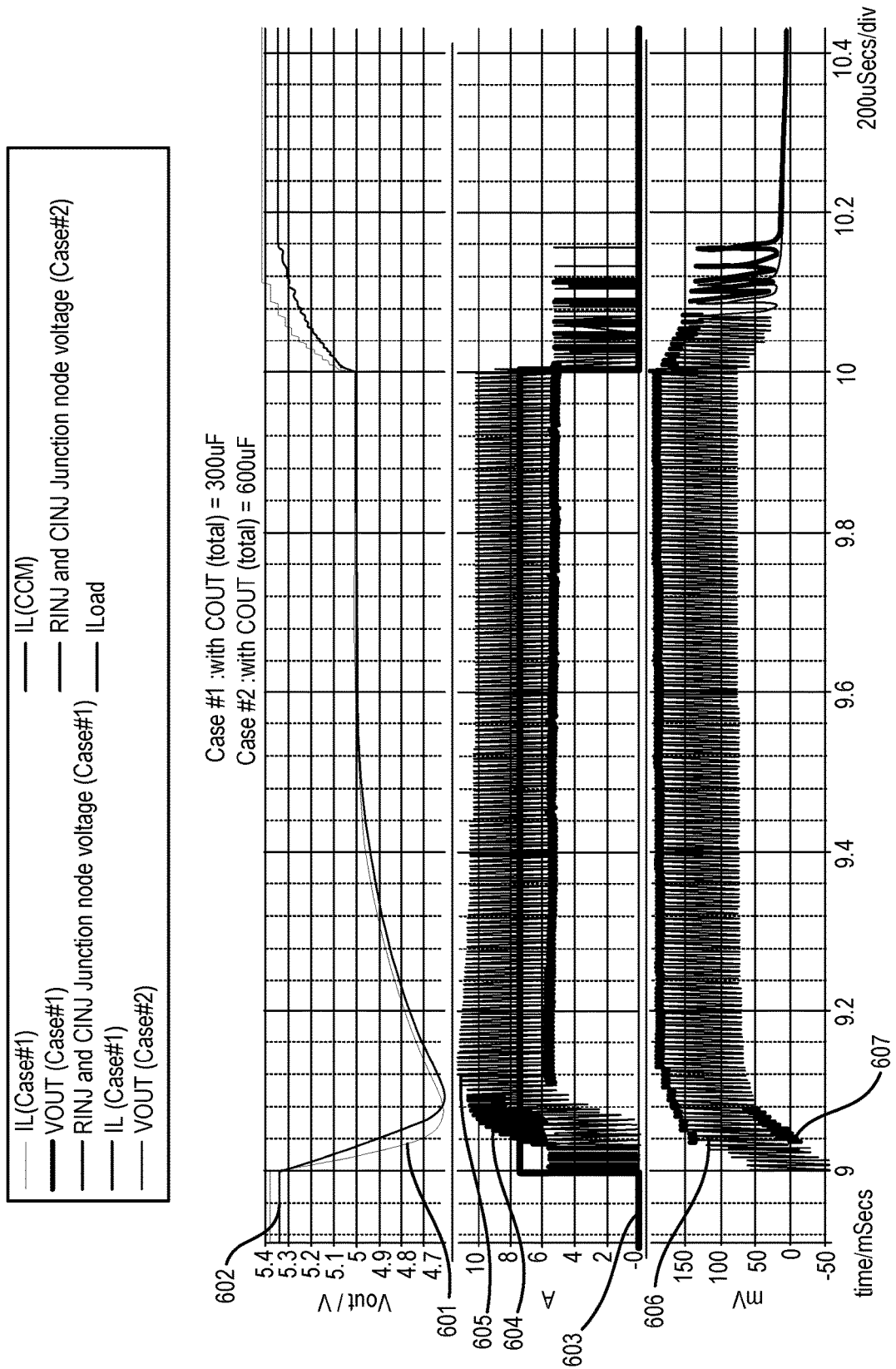
FIG. 6 shows the load transient response in DCM mode with the typical INJ signal generator of FIG. 2 at two different output capacitances.

FIG. 6 shows the load transient performance when the output capacitance is doubled. More specifically, waveform 601 shows the output voltage VOUT when the output capacitance COUT is 300 uF, waveform 602 shows the output voltage VOUT when the output capacitance COUT is 600 uF, waveform 603 shows the load current, waveform 604 shows the current through the inductor L1 when the output capacitance COUT is 300 uF, waveform 605 shows the current through the inductor L1 when the output capacitance COUT is 600 uF, waveform 606 shows the voltage at the node between CINJ and RINJ when the output capacitance COUT is 300 uF, and waveform 607 shows the voltage at the node between CINJ and RINJ when the output capacitance COUT is 600 uF. From FIG. 6 it is clear that the effect of doubling the output capacitance has very minimal impact on the output voltage VOUT during the load transient. At the same time, adding more output capacitance increases BOM (Bill Of Material) cost and solution size.

The reason the output voltage dip is not affected significantly by doubling the output capacitance is because of the delay the RINJ&CINJ junction node takes to reach its target value as shown in FIG. 6. The delay the RINJ&CINJ node takes to reach its target value is independent of the output capacitance. In addition, as the output capacitance increases, the output voltage falling slew rate during a load transient decreases, and hence the system response is slower. This keeps the output voltage dip almost constant during load transient when the output capacitance is doubled.

Figure 7:
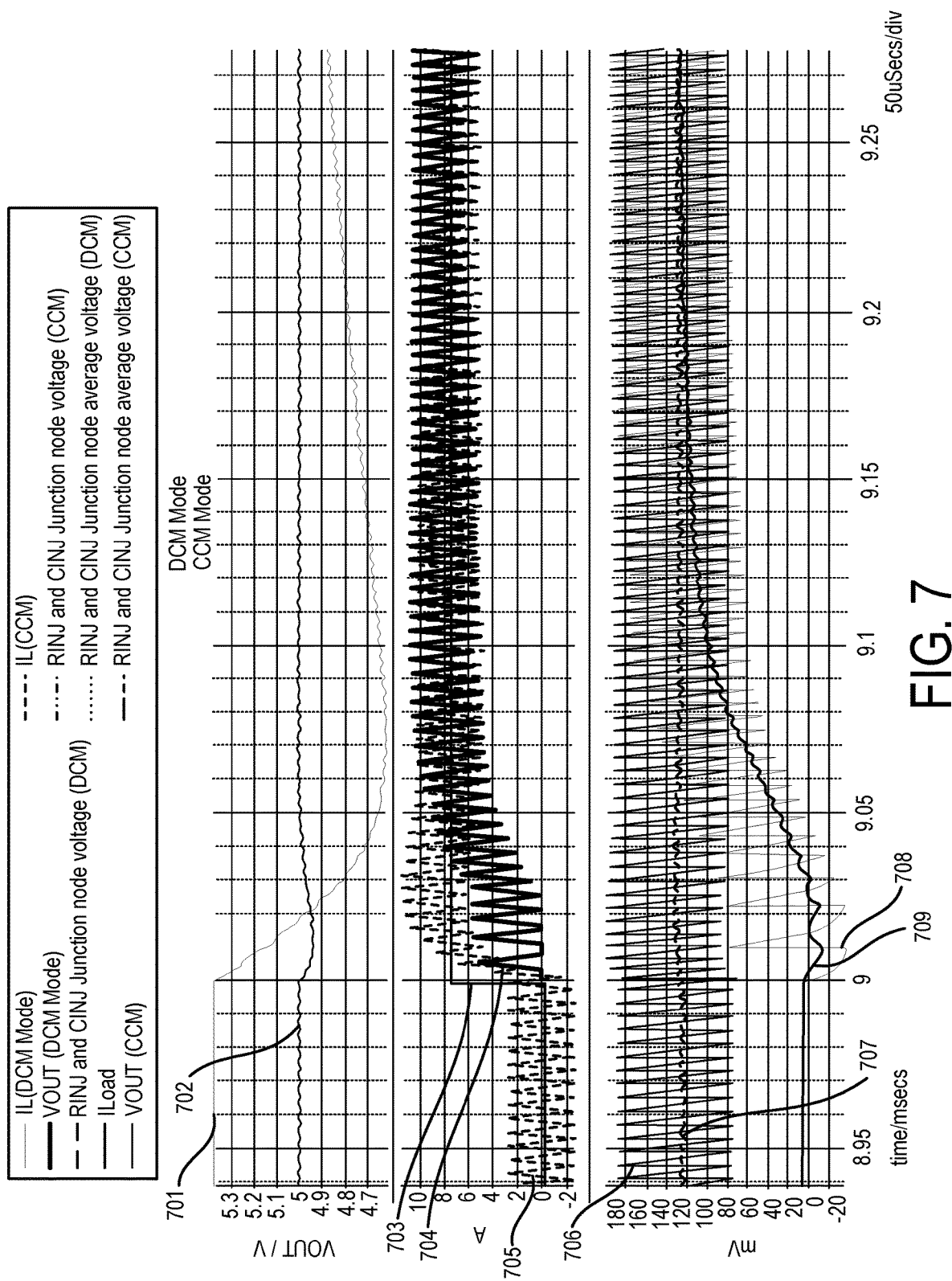
FIG. 7 shows the load transient simulation results of the circuit of FIG. 1 operating in DCM and CCM mode showing RINJ&CINJ junction node response during load transient.

FIG. 7 shows the detailed simulation results of the circuit of FIG. 1 operating in DCM and CCM mode at the instant when a sudden load of 7.5 A is applied on the converter while operating at no load. Referring to FIG. 7, waveform 701 shows the output voltage VOUT in DCM mode, waveform 702 shows the output voltage VOUT in CCM mode, waveform 703 shows the load current, waveform 704 shows the current through inductor L1 in DCM mode, waveform 705 shows the current through inductor L1 in CCM mode, waveform 706 shows the voltage at the node between CINJ and RINJ in CCM mode, waveform 707 shows the average voltage at the node between CINJ and RINJ in CCM mode, waveform 708 shows the voltage at the node between CINJ and RINJ in DCM mode, waveform 709 shows the average voltage at the node between CINJ and RINJ in DCM mode. It can be seen from FIG. 7 that the OFF time of the converter is initially longer at the instant when the load is applied and is gradually decreasing. The longer OFF time is because the initial average voltage of RINJ& CINJ junction node before the load is applied is much lower than the initial average voltage of RINJ& CINJ junction node in CCM mode. The average RINJ&CINJ junction node voltage affects the falling slew rate of the FB ripple voltage signal. As the RINJ&CINJ junction node average voltage decreases, the time the FB voltage takes to initiate the next switching increases, which increases the OFF period.

When a load step is applied at the 9 mSec mark, the output voltage VOUT drops, and hence the converter turns on the high side MOSFET (Q1) as the output voltage drop propagates to the FB node, and causes the controller to initiate the next switching. This reduces the OFF period and causes the RINJ&CINJ junction node average voltage to increase, which reduces the OFF time further. This repeats until the average RINJ&CINJ junction node voltage reaches its target value, which equals the value that corresponds to its average voltage in CCM mode that is given by the (Equation 1 if the load transient is high enough to bring the converter into CCM mode.

In order to reduce the output voltage dip in DCM mode when a sudden load is applied, the average voltage of RINJ&CINJ node voltage should reach its target more quickly. But how fast the RINJ&CINJ junction node reaches its target depends on the time constant of the circuit formed by CINJ, RINJ, CFF, RFB1 and RFB2, which components are generally chosen based on the amount of FB ripple voltage needed, loop crossover frequency and phase margin. So once these components are chosen, the time that RINJ& CINJ junction node takes to reach its target is fixed.

According to an exemplary embodiment, the output voltage dip in DCM mode during a load transient may be reduced by biasing the INJ node at a voltage that corresponds to its CCM mode average voltage that is given by the (Equation 1. Doing so may improve the DCM mode load transient response, as the RINJ&CINJ junction node is biased at its CCM mode average value. Hence there may be virtually no delay involved in responding to a load transient. This may be achieved by modifying the INJ signal generator, as shown in FIGS. 8 and 9.

Figure 8:
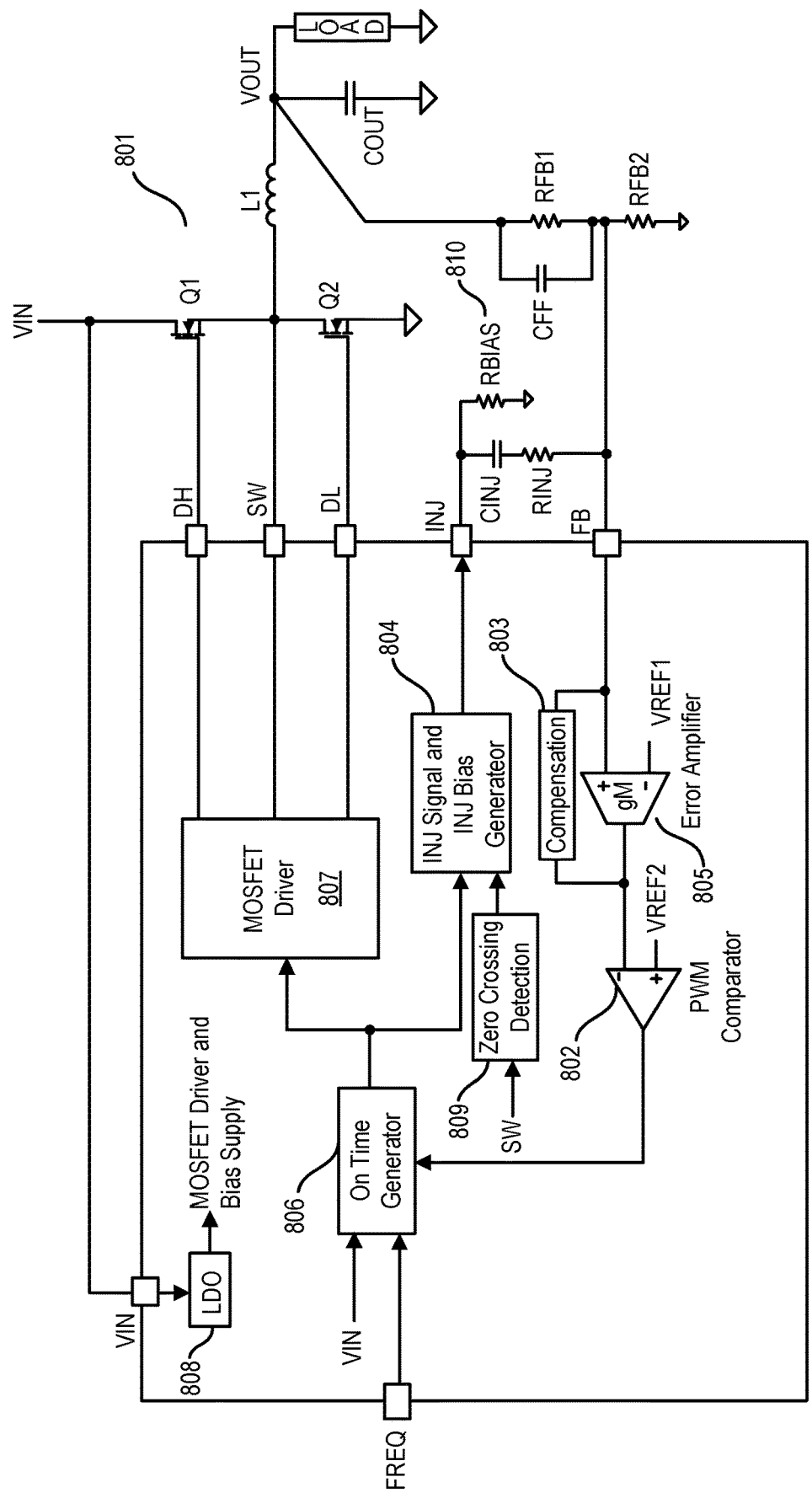
FIG. 8 shows a functional block diagram of a constant on time (COT) buck converter with calibrated ripple injection and an INJ signal generator according to an exemplary embodiment.

FIG. 8 shows a functional block diagram of a constant on time (COT) buck converter with calibrated ripple injection and an INJ signal generator according to an exemplary embodiment. Similar to FIG. 1, the exemplary embodiment of FIG. 8 may include an error amplifier 805 with a compensation circuit 803, a PWM comparator 802, an adaptive on-time generator 806, a MOSFET gate driver circuit 807, an INJ signal generator 804, and a low Dropout Regulator (LDO) 808. As shown in the exemplary embodiment of FIG. 8, a bias resistor RBIAS 810 may be coupled between the INJ node and ground in order to bias the INJ node to a particular voltage. In addition, the controller may include a zero crossing detection circuit 809 that is coupled to the SW node to detect when the current through inductor L1 is zero. The zero crossing detection circuit 809 is coupled to the INJ signal generator 804, which is coupled to the INJ node.

Figure 9:
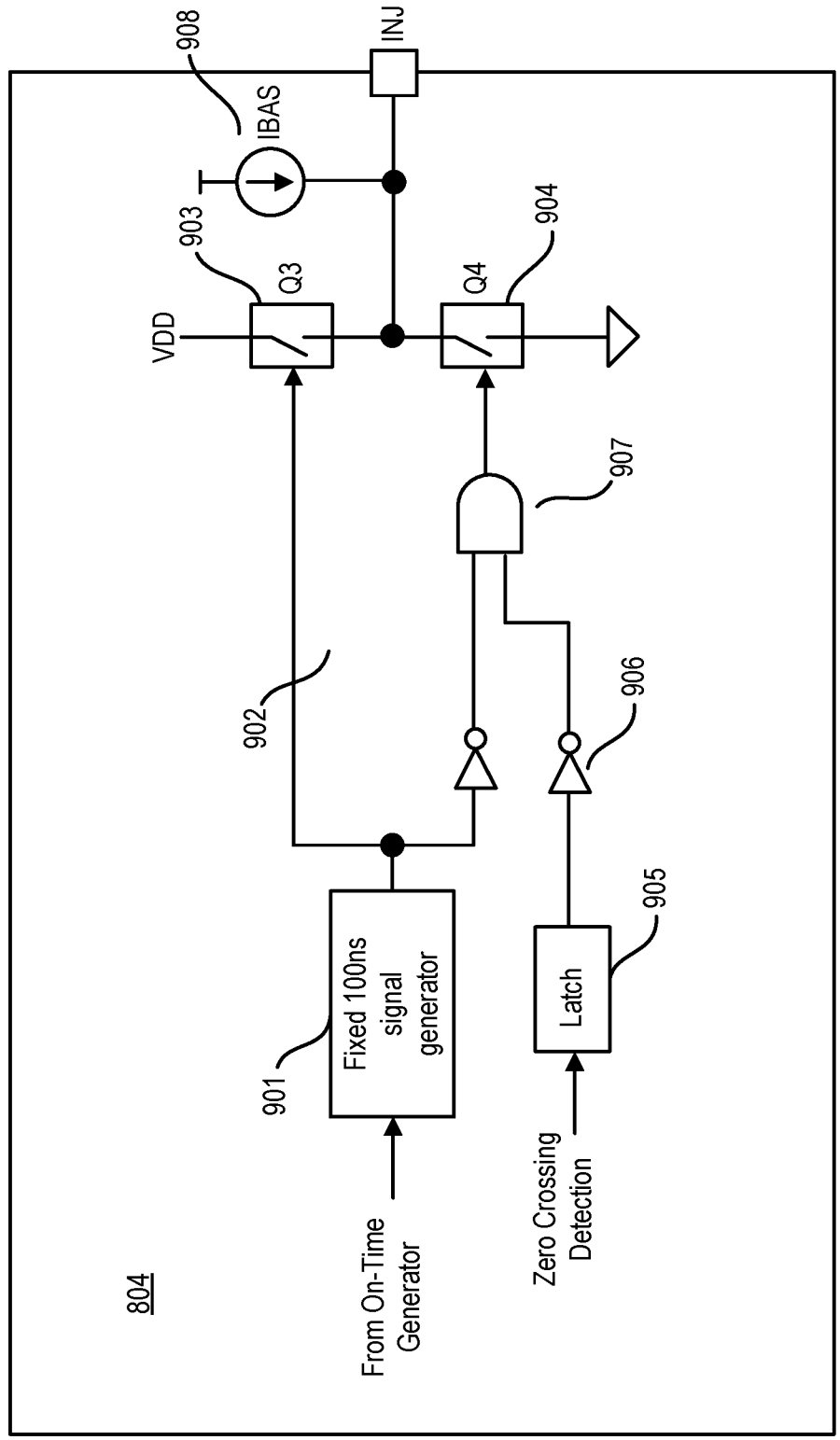
FIG. 9 shows an INJ signal generator according to an exemplary embodiment.

As shown in the exemplary embodiment of FIG. 9, the INJ signal generator 804 may include a latch 905 that receives the output of the zero crossing detection circuit 809. The INJ signal generator 804 of the exemplary embodiment may also include a fixed 100 ns signal generator 901 that receives the output of the ON Time Generator 806. The output of the latch 905 may be coupled to an inverter 906, the output of which may be coupled to a first input of an AND gate 907. The output of the fixed 100 ns signal generator 901 may be coupled to an inverter 902, the output of which may be coupled to the second input of the AND gate 907. The output of the fixed 100 ns signal generator 901 may also be coupled to a switch Q3 (903), which is coupled between VDD and the INJ node. The output of the AND gate 907 is coupled to a switch Q4 (904), which is coupled between the INJ node and ground. The INJ signal generator 804 of the exemplary embodiment may also include a constant current source IBIAS 908, which is coupled to the INJ node.

In the case of a traditional INJ signal generator which is shown in FIG. 2, the INJ node voltage is high (typically 5V) during the ON period, and is low (typically 0V) during the OFF period. In an INJ signal generator according to an exemplary embodiment, the INJ node voltage is high during the ON period but it is low for only the portion of the OFF period from the end of the ON time to the instant the inductor current drops to zero (refer to FIG. 3). According to an exemplary embodiment, the INJ signal generator will be kept in high impedance mode (i.e., both Q3 and Q4 are turned off, refer to FIG. 9) once the inductor drops to OA until the ON-Time generator generates the next ON-Time event. The zero cross detection circuit 809 detects the instant at which the inductor current drops to OA. While the INJ signal generator is in high impedance mode, the constant current source (IBIAS) 908 biases the INJ node at a voltage set by an external resistor (RBIAS) 810 connected between the INJ node and ground, as shown in FIG. 8. If the value of RBIAS 810 is chosen based on (Equation 3 (below), then the INJ node, and hence the average voltage of the RINJ&CINJ junction node, will remain biased at its target value.

$$RBIAS = \frac{V_{INJ(Avg)}}{IBIAS} \quad \text{(Equation 3)}$$

Where VINJ(Avg) is the steady state voltage of the RINJ and CINJ junction node which is given by (Equation 1.

By substituting VINJ(Avg) into (Equation 3, the value of RBIAS can be calculated using (Equation 4 (below):

$$RBIAS = V_{INJ} * \frac{t_{ON(INJ)}}{T_{SW}} * \frac{1}{IBIAS} \quad \text{(Equation 4)}$$

According to an exemplary embodiment, VINJ=5V, tON (INJ)=100 ns, fsw=250 KHz (Tsw=4 us) and IBIAS=5 uA. This results in RBIAS=25KΩ, however other values may be chosen for these parameters.

Figure 10:
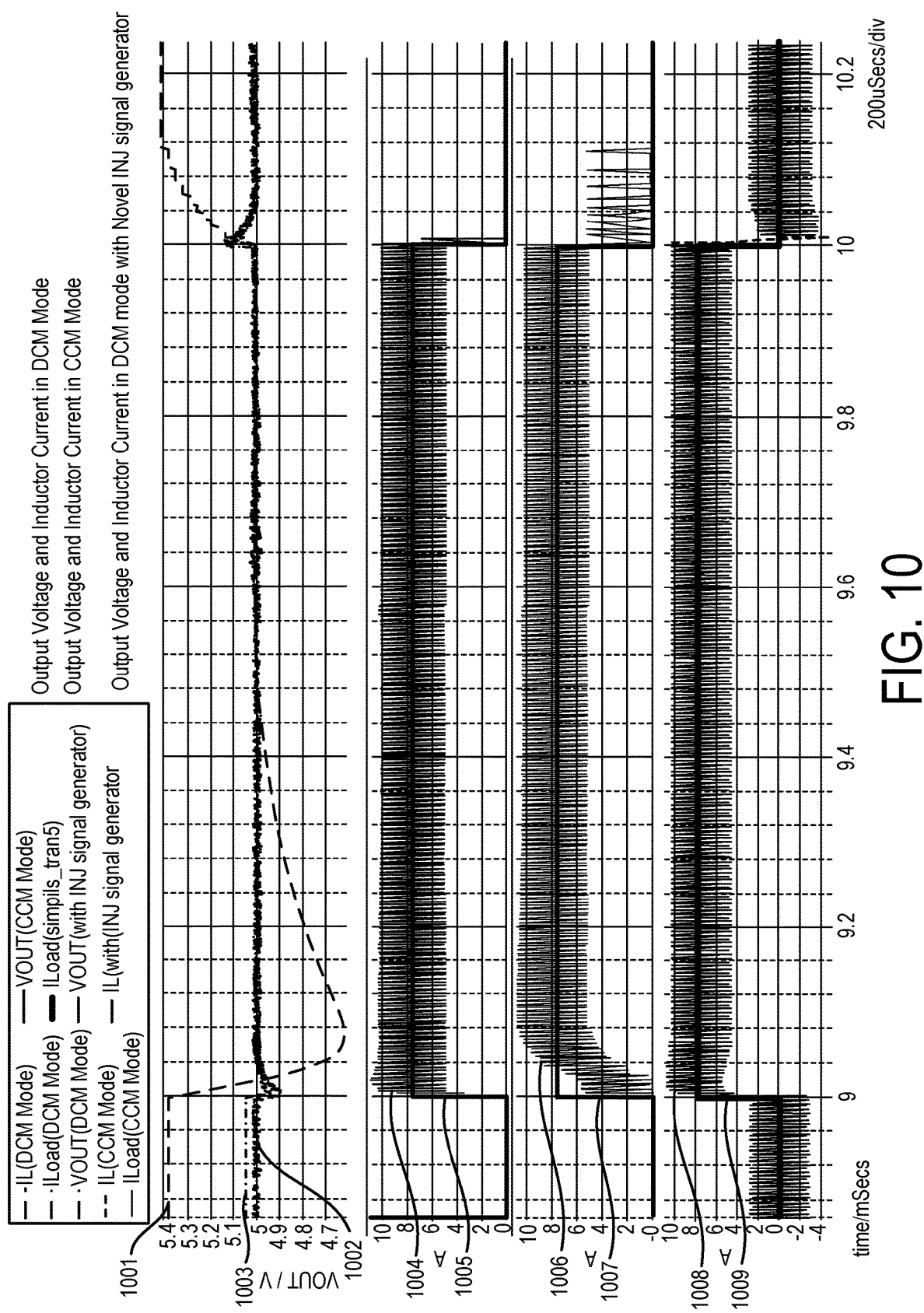
FIG. 10 shows the load transient response of the circuit of FIG. 1 operating in DCM mode with a typical INJ signal generator, and the load transient response of the constant on time (COT) buck converter having an INJ signal generator according to an exemplary embodiment operating in CCM mode and in DCM mode.

FIG. 10 shows the load transient simulation results of the circuit of FIG. 1 operating in DCM mode with a typical INJ signal generator 104, and the load transient response of the constant on time (COT) buck converter having an INJ signal generator 804 according to the exemplary embodiment of FIG. 8 operating in CCM mode and in DCM mode. Referring to FIG. 10, waveform 1001 shows the output voltage VOUT of the circuit of FIG. 1 operating in DCM mode, waveform 1002 shows the output voltage of the circuit of FIG. 1 operating in CCM mode, and waveform 1003 shows the output voltage VOUT of the circuit of FIG. 8 operating in DCM mode. Waveform 1004 shows the current through inductor L1 in the circuit of FIG. 8 operating in DCM mode, waveform 1005 shows the load current in the circuit of FIG. 8 operating in DCM mode, waveform 1006 shows the current through inductor L1 in the circuit of FIG. 1 operating in DCM mode, waveform 1007 shows the load current in the circuit of FIG. 1 operating in DCM mode, waveform 1008 shows the current through inductor L1 in the circuit of FIG. 1 operating in CCM mode, and waveform 1009 shows the load current in the circuit of FIG. 1 operating in CCM mode. Note that IBIAS 908 has no effect in CCM mode as the zero-crossing detection is not active in CCM mode. It can be seen from FIG. 10 that the output voltage dip for a load transient in DCM mode with the INJ signal generator 804 of the exemplary embodiment (waveform 1003) is almost equal to the output voltage dip in CCM mode (waveform 1002). The following Table 1 summarizes the load transient data:

TABLE 1

| | Output voltage dip below the regulation point | Total output voltage dip | Output voltage rise above regulation |
|---|---|---|---|
| CCM mode | 70 mV (1.4%) | 70 mV (1.4%) | 99 m (1.98%) |
| DCM mode with typical INJ signal generator | 378 mV (7.56%) | 760 mV (15.2%) | 410 m (8.2%) |
| DCM mode with exemplary | 52 mV (1.04%) | 90 mV (1.8%) | 99 m (1.98%) |

TABLE 1-continued

| | Output voltage dip below the regulation point | Total output voltage dip | Output voltage rise above regulation |
|---|---|---|---|
| embodiment INJ signal generator | | | |

From the Table 1 it is clear that the INJ signal generator 804 according to an exemplary embodiment may improve the DCM mode load transient by a factor of approximately 8.44.

Figure 11:
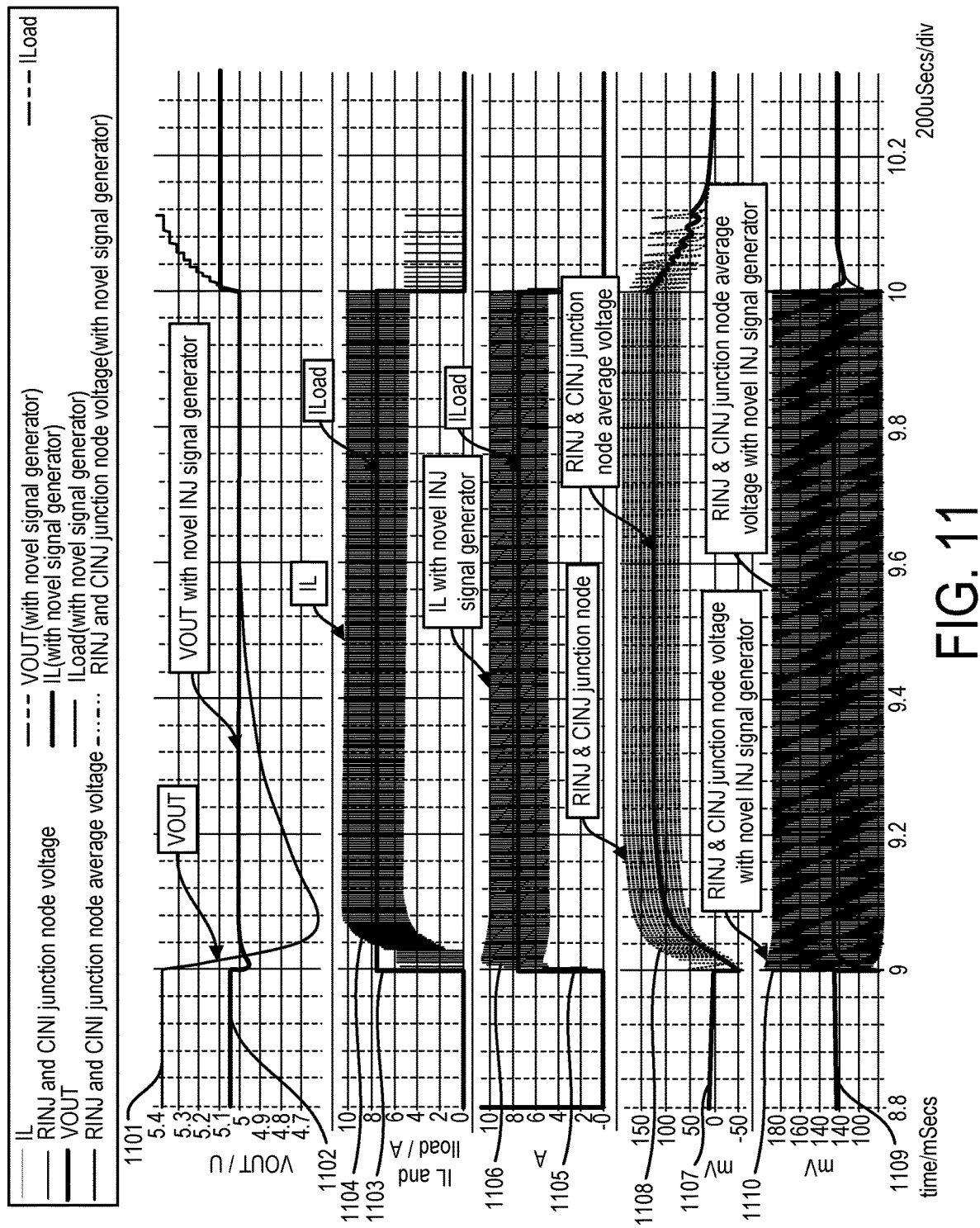
FIG. 11 shows the load transient performance comparison of the circuit of FIG. 1 operating in DCM mode with a typical INJ signal generator, and the constant on time (COT) buck converter having an INJ signal generator according to an exemplary embodiment operating in DCM mode.

FIG. 11 shows how the RINJ & CINJ junction node is responding to a load transient with a prior art INJ signal generator of FIG. 2 and with an INJ signal generator according to the exemplary embodiment of FIG. 9. Referring to FIG. 11, waveform 1101 shows the output voltage VOUT of the circuit of FIG. 1 operating in DCM mode, waveform 1102 shows the output voltage VOUT of the circuit of FIG. 8 operating in DCM mode, waveform 1103 shows the load current of the circuit of FIG. 1, waveform 1104 shows the current through inductor L1 in the circuit of FIG. 1, waveform 1105 shows the load current of the circuit of FIG. 8, and waveform 1106 shows the current through inductor L1 in the circuit of FIG. 8. Waveform 1107 shows the average voltage at the node between CINJ and RINJ of the circuit in FIG. 1 operating in DCM mode, and waveform 1108 shows the instantaneous voltage of the node between CINJ and RINJ of the circuit in FIG. 1 operating in DCM mode. Waveform 1109 shows the average voltage at the node between CINJ and RINJ of the circuit in FIG. 8 operating in DCM mode, and waveform 1110 shows the instantaneous voltage of the node between CINJ and RINJ of the circuit in FIG. 8 operating in DCM mode. As shown in FIG. 11, the INJ node and hence the RINJ&CINJ junction node is biased at its target value and hence there is virtually no delay involved while responding to the load transient.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:
1. A constant on-time controller for a buck converter, the controller comprising:
   a pulse width modulator (PWM) comparator that generates an on-time request;
   an error amplifier that regulates an average feedback voltage to an internal reference voltage, and passes a feedback node ripple signal to an input of the PWM comparator;
   an on-time generator that outputs an on-time signal that controls an on-time of the buck converter based on the on-time request;
   a MOSFET driver that drives the buck converter based on the output of the on-time generator;
   a zero crossing detection circuit configured to detect when a current through an inductor of the buck converter equals zero; and
   an injection signal generator coupled to said on-time generator, said injection signal generator configured to output an injection signal that limits a dip in an output voltage of the buck converter during a load transient based on an output of the zero crossing detection circuit indicating that the current through the inductor of the buck converter equals zero;
wherein the error amplifier receives a feedback voltage based on the output of the injection signal generator and based on the output voltage of the buck converter.

2. The controller of claim 1, wherein the injection signal generator comprises:
a first switch;
a second switch coupled to the first switch;
a fixed signal generator; and
a bias current source;
wherein said first and second switches are coupled to said fixed signal generator, and to the output of the injection signal generator; and
wherein said bias current source is coupled to a node between said first and second switches and to said output of said injection signal generator.

3. The controller of claim 2, wherein the injection signal generator further comprises an AND gate comprising an output that is coupled to the second switch, a first input that is coupled via a first inverter to the fixed signal generator, and a second input that is coupled to a latch via a second inverter.

4. The controller of claim 3, wherein the latch receives the output of the zero crossing detection circuit.

5. The controller of claim 4, wherein the first and second switches are configured to be open in response to the zero crossing detection circuit detecting that the current through the inductor of the buck converter equals zero.

6. The controller of claim 2, wherein the bias current source is a constant bias current source.

7. A device comprising:
a buck converter power stage comprising two MOSFETs, an inductor and an output capacitor;
a controller coupled to the buck converter power stage; and
a ripple voltage circuit coupled to an output of the buck converter power stage and the controller;
wherein said controller comprises:
  a pulse width modulator (PWM) comparator that generates an on-time request;
  an error amplifier having a compensation circuit, said error amplifier having an input coupled to a feedback terminal of the controller, and an output coupled to the PWM comparator;
  an on-time generator that outputs an on-time signal that controls an on-time of the buck converter based on the on-time request;
  a MOSFET driver that drives the buck converter based on the output of the on-time generator;
  a zero crossing detection circuit configured to detect when a current through the inductor of the buck converter equals zero; and
  an injection signal generator coupled to said on-time generator, said injection signal generator configured to output an injection signal that limits a dip in an output voltage of the buck converter power stage during a load transient based on an output of the zero crossing detection circuit indicating that the current through the inductor of the buck converter power stage equals zero;
wherein the error amplifier receives a feedback voltage based on the output of the injection signal generator and based on the output voltage of the buck converter power stage;
wherein said ripple voltage circuit comprises an injection resistor, an injection capacitor, and a bias resistor;
wherein said injection capacitor comprises a first terminal coupled to the output of the injection signal generator and a second terminal coupled to said injection resistor;
wherein said injection resistor comprises a first terminal coupled to the second terminal of said injection capacitor, and a second terminal coupled to a feedback terminal of said controller;
wherein said bias resistor comprises a first terminal coupled to the output of the injection signal generator and a second terminal coupled to ground.

8. The device of claim 7, wherein the ripple voltage circuit further comprises a resistive voltage divider having a first resistor and a second resistor, and a feed forward capacitor coupled in parallel with the first resistor of said resistive voltage divider;
wherein the feedback terminal of the controller is coupled between the first and second resistors of said resistive voltage divider; and
wherein the output of the buck converter is coupled to the first resistor of said resistive voltage divider and the feed forward capacitor.

9. The device of claim 7, wherein the injection signal generator comprises:
a first switch;
a second switch coupled to the first switch;
a fixed signal generator; and
a bias current source;
wherein said first and second switches are coupled to said fixed signal generator, and to the output of the injection signal generator; and
wherein said bias current source is coupled to a node between said first and second switches and to said output of said injection signal generator.

10. The device of claim 9, wherein the injection signal generator further comprises an AND gate comprising an output that is coupled to the second switch, a first input that is coupled via a first inverter to the fixed signal generator, and a second input that is coupled to a latch via a second inverter.

11. The device of claim 10, wherein the latch receives the output of the zero crossing detection circuit.

12. The device of claim 9, wherein the bias current source is a constant bias current source.

13. The device of claim 9, wherein the first and second switches are configured to be open in response to the zero crossing detection circuit detecting that the current through the inductor of the buck converter power stage equals zero.

14. An injection signal generator for generating a feedback ripple voltage for a buck converter controller, said injection signal generator comprising:
a first switch coupled between a power supply and an output of the injection signal generator;
a second switch coupled between the output of the injection signal generator and ground;
a fixed signal generator coupled to the first switch and second switch; and
a bias current source configured to bias the output of the injection signal generator when the first switch and the second switch are open.

15. The injection signal generator of claim 14, further comprising an AND gate comprising an output that is coupled to the second switch, a first input that is coupled via a first inverter to the fixed signal generator, and a second input that is coupled to a latch via a second inverter.

16. The injection signal generator of claim 15, wherein the latch is configured to receive a signal indicating when a current through an inductor of the buck converter equals zero.

17. The injection signal generator of claim 15, wherein the first and second switches are configured to be open in response to the latch receiving a signal indicating that the current through the inductor of the converter equals zero.

18. A method for controlling a load transient response of a constant on time buck converter while operating in discontinuous conduction mode (DCM), the method comprising:
   generating an on-time request using a PWM comparator based on a feedback voltage;
   outputting an on-time signal that controls an on-time of the buck converter based on the PWM comparator on-time request;
   driving the buck converter based on the on-time signal;
   creating a feedback voltage ripple using an injection signal generator and external components;
   detecting when a current through an inductor of the buck converter equals zero;
   outputting a bias current to achieve a target voltage that limits a dip in an output voltage of the buck converter during the load transient based on detecting that the current through the inductor of the buck converter equals zero.

* * * * *